UNITED STATES PATENT OFFICE.

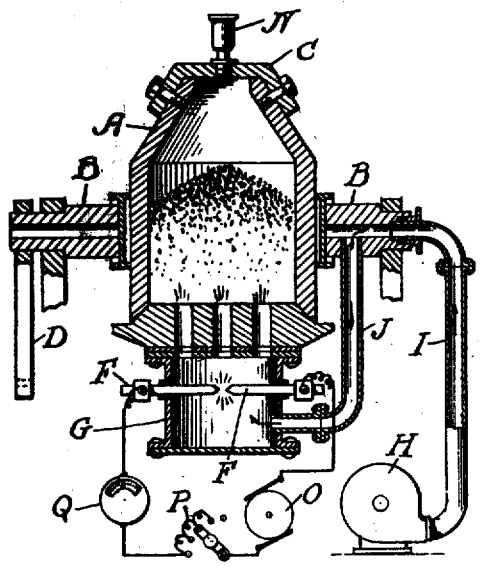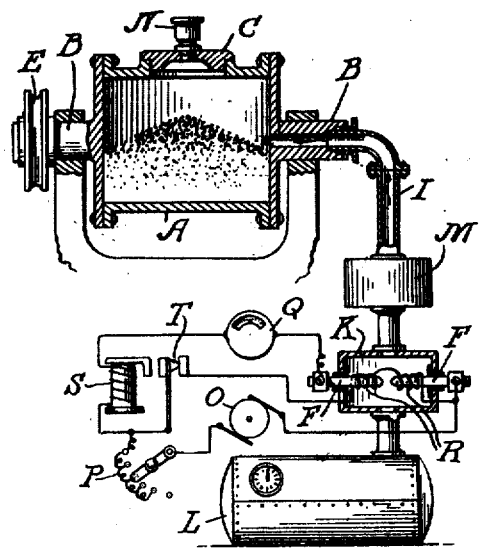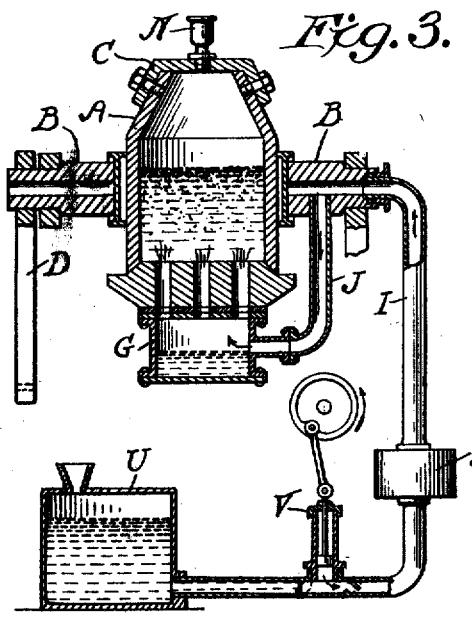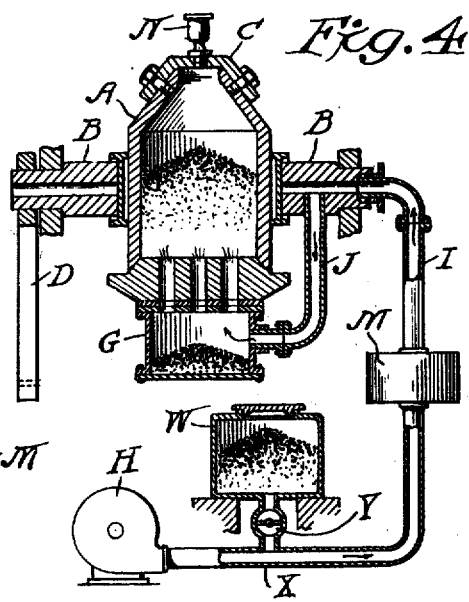

PETER ORANCE, OF NEW YORK, N. Y.

PROCESS OF MAKING DUCTILE BODIES OF REFRACTORY MATERIALS.

1,297,000.      Specification of Letters Patent.      Patented Mar. 11, 1919.

Application filed February 5, 1917. Serial No. 146,778.

*To all whom it may concern:*

Be it known that I, PETER ORANCE, a subject of the Czar of Russia, and resident of New York city, in the county of New York and State of New York, have invented certain new and useful Improvements in the Processes of Making Ductile Bodies of Refractory Materials, of which the following is a specification.

The main object of this invention is to provide means whereby high-fusing refractory materials and their alloys, such as tungsten, molybdenum and similar metals, may be formed into suitably-shaped blocks or ingots to be subsequently drawn into ductile wires used as filaments for incandescent lamps, wire-nettings, heating devices, radiographic and other instruments, or rolled into bars or plates, to be used as contacts for electric circuits, as X-ray targets and for other purposes; or whereby such materials may be made into a paste which may be formed into ductile rods or wires by the squirting process.

In all processes for making ductile bodies of tungsten or similar refractory materials, an oxid of the refractory material is first combined or mixed with a foreign substance, which may be either metallic, mineral or organic, and which not only acts as a binding agent, but which has been found absolutely necessary and beneficial when it actually becomes an ingredient thereof, as the success of the resulting material lies in the chemical constitution of the primary material from which the ductile bodies are subsequently made. According to the manner in which the auxiliary or foreign material is added to the oxid, the various known processes for making ductile bodies of refractory materials may be classed into the following three methods:

1. Solid or block method, in which metallic or other auxiliary materials are added to the tungstic or other oxid in powdered form, the powder mixture being compressed into blocks or rods which are subsequently treated to form the ingot.

2. Liquid or paste method, in which an organic or other substance is admixed to the powdered oxid in aqueous or other solution, or in the form of a paste, the mixture forming a paste which is pressed into bars from which the binding agent is then eliminated by some suitable means, leaving the comparatively pure metal behind which, after being heated to a high temperature, is ductile when cold.

3. Distillation method, in which the auxiliary material, added to the refractory oxid, is volatilized or distilled from the crucible in which the powdered tungstic or other oxid is fused, the material of the crucible being suitably chosen, some mineral or combination of minerals being usually selected.

The improved process to be hereinafter described, which consists chiefly in a new method of mixing the auxiliary material with the oxid, and in means for employing this method, not only can be applied to all three of the above-described methods, but also lends itself to the following fourth method not heretofore practiced, namely:—

4. Gaseous method, in which a gas or vapor of a suitable material is forced into a closed vessel containing the tungstic or other oxid in powdered form, the powder, after thorough mixing with the gases, being treated in the usual way and finally made into blocks or ingots.

Moissan discovered long ago that tungsten is malleable and capable of being welded far below its fusing point which is between 3000° and 3200° C., by subjecting compound masses formed from tungsten powder to mechanical treatment at temperatures of about 800° to 1000° C., and Dr. Wm. D. Coolidge found that the more a tungsten ingot, properly prepared, is worked mechanically, the more ductile the resulting product becomes.

Of the many processes practised in the art of making ductile tungsten, the following may be given as typical examples:

Wm. D. Coolidge, of the General Electric Co., (Patent No. 1,082,933, Dec. 30, 1913) adds a small percentage of silica and alumina to the tungsten oxid, the silica and alumina being derived from the crucible employed in reducing the oxid.

Theo. W. Frech, assignee to the General Electric Co., (Patent No. 1,089,757, March 10, 1914) adds thorium nitrate in aqueous solution to the tungstic acid, thus forming a paste which he presses into bars.

Alfred G. Liebman of the Independent Lamp & Wire Co., (Patent No. 1,111,698, Sept. 22, 1914) adds pure metallic tungsten powder to the tungstic oxid in dry form and then compresses the mixture into sticks to be subsequently treated to form the ingots.

In these three processes, the material obtained, after additional treatment, is rolled into plates, or drawn into wires, or otherwise worked mechanically.

George P. Scholl of the Westinghouse Lamp Co., (Patent No. 1,086,088, Feb. 3, 1914) adds casein to make the paste and then employs the squirting process for the direct manufacture of lamp filaments thereof.

All other existing processes are, to a greater or less degree, modifications of the above typical examples, varying from them only in the auxiliary materials employed and in the manner of working the mixtures.

In all the present processes, the admixing of the auxiliary material with the oxid of the refractory metal is performed in stationary vessels under atmospheric pressure. Now, it is a well-known fact that powders, as a rule, do not intermix thoroughly and evenly under these conditions, while pastes and liquids are not sufficiently viscous to form a uniform layer around each particle of the oxid powder, and gases or vapors, finally, although having great viscosity, will not penetrate thoroughly into a stationary mass of powder under ordinary atmospheric pressure. For these reasons, it has been found necessary, in some of the old processes, to employ enormous pressures, often as high as 50,000 pounds per square inch, when forming the mixture into rods for subsequent working, in order to effect a sufficiently uniform distribution of the auxiliary material. This high compression causes the disadvantage in the subsequent working of the compressed body that it necessitates prolonged heating in a strong reducing atmosphere to partly or wholly eliminate the admixed auxiliary matter. It furthermore increases the duration and cost of manufacture, and limits the manufacture to rods of comparatively small sizes, rarely more than ¼" in diameter and 6" in length, which are inconvenient commercially, besides being uneconomical.

In my process, the admixture of the auxiliary material with the refractory oxid is performed under pressure as well as under continual agitation of the powdered oxid, so that complete and uniform penetration takes place. Under these conditions, I further take advantage of the fact that an auxiliary material in the gaseous state, when blown through a suitable metallurgical apparatus in which powdered oxid is placed, will completely and uniformly envelop the particles of the oxid powder. The auxiliary material may be any of the substances already successfully employed in the manufacture of ductile refractory materials, such as carbonaceous substances, oxids or nitrates of chromium, zirconium, thorium, boron, yttrium, erbium, didymium, ytterbium, and other minerals or rare earths which, when decomposed by heating, produce certain desirable oxids. But the auxiliary material is in my process employed in the gaseous form derived in the manner to be subsequently described. After the refractory oxid has been thoroughly saturated with the gas, it is pressed into the form of bars or ingots, the pressure required being much less than needed for a mixture made under atmospheric pressure, especially a paste or a powder admixture, hence much larger ingots or bars may be made by this process.

The bar or ingot thus obtained is ready for the usual treatment in a suitable furnace, such as the electrical tube furnace of Winne & Dantzisen, described on Sept. 21, 1911, in the *Transactions of the Electro-chemical Society* (vol. XX, p. 289), or a high-temperature gas furnace, the heating being continued until the material is more or less pure, the purity depending upon the duration of the reduction process, the thickness of envelop of the auxiliary material, and the pressure of the gaseous substance acting upon the particles of the refractory oxid. When the gaseous or liquid method is employed, the particles may be reduced without pressing them in the form of a rod, by placing them in the reduction furnace in powdered form, if desired.

The gas employed as a flux to reduce the refractory oxid into the metallic state is forced into the mixing apparatus by a blast of air furnished by a blower, a compressed-air tank, or other source, so that the mixture takes place in an oxydizing atmosphere.

When the reduction process is completed, the mass is sintered into rods or blocks, the blocks thus produced being then ready to be swaged, rolled, or drawn, by any of the well-known methods. This process thus reduces the number of operations necessary to produce the finished material. Since the time of the treatment is greatly reduced and the size of the treated ingots greatly increased, it is obvious that my process offers possibilities of manufacturing ductile tungsten, molybdenum, and other metals, on a large scale, more economically than other processes now in use; furthermore, the product is of superior quality due to the much more uniform treatment of the oxids, and the necessity of carefully selecting the sizes of the grains of the oxid powder employed, requiring a certain amount of skill and experience in manufacture, is obviated. Another advantage of my process is that the amount of the auxiliary material added to the refractory oxid is at all times under perfect control, a condition which cannot be attained in many of the previous processes.

The working of this process and the apparatus employed will be understood from the following description, reference being had to the accompanying drawings, in which—

Figure 1 is a diagram showing the apparatus employed in applying the improved process to the gaseous method of making ductile bodies of refractory materials by the use of an auxiliary gas or vapor, the gas in this case being produced by electric vaporization in the blast chamber of an oscillating Bessemer converter containing the refractory oxid.

Fig. 2 is a diagram showing the apparatus employed in the gaseous process, the gas being generated in a separate electric arc chamber connected with a rotary cylindrical mixing vessel by a pipe.

Fig. 3 is a diagram showing the arrangement of the apparatus for applying the liquid or paste method of making ductile refractory materials by the use of an auxiliary solution.

Fig. 4 is a diagram showing the apparatus for the solid method of making ductile refractory materials by the use of an auxiliary powder.

The essential steps in my process are as follows:

The tungsten or other oxid is obtained as pure as commercially possible and passed through any of the refining processes in the well-known manner. The refined tungstic oxid is put into the vessel A, which may be a top-, bottom-, or side-blown Bessemer converter as shown in Figs. 1, 3 and 4, or any other metallurgical vessel suitable for the purpose, as in Fig. 2. The mouth of this vessel is hermetically closed by the cover C, and the charge of tungsten oxid is then treated by blowing through it a suitable gas, fluid, paste, or powder, while the vessel is oscillated or rotated about its hollow trunnions B. In Fig. 1, the vessel A is a Bessemer converter which is provided with a rocking arm D by which it may be oscillated about its trunnions B when attached to a suitable source of power. In Fig. 2, the vessel A is a closed drum carried upon hollow trunnions B to one of which a pulley E is attached so that the drum A may be rotated.

While the vessel A is agitated in the manner described, the gas, which is produced by vaporization in an electric arc between electrodes of suitable material, is forced into the mixing chamber by a blast of air. In Fig. 1, the electric arc electrodes F, F are placed in the blast chamber G of the converter, and the air-blast is furnished by a blower H connecting by pipe I with one of the hollow trunnions B, which is connected by pipe J with the blast-box G. In Fig. 2, the gas is generated in a separate electric arc chamber K, the air-pressure in this case being supplied by a compressed air tank L, and the blast being heated before entering the vessel A by passing through an electric oven M or other suitable heating apparatus. To guard against excessive pressure within the mixing chamber, the cover C, instead of being rigidly fastened, may be held in place by hydraulic or other pressure, or the vessel A may be provided with a blow-off valve N or other suitable outlet.

The electrodes F which are to be vaporized by the current, may be of carbon, chromium, titanium, zirconium, thorium, boron, or any other suitable metal, alloy, oxid, nitrate, etc. They are connected in circuit with a generator O, rheostat P, and current indicator Q. If the electrodes are made of a material which will not conduct electricity until heated up to a certain temperature, an arrangement similar to that employed in the Nernst lamp is used to automatically bring them up to the required temperature. Each electrode F, as shown in Fig. 2, is for this purpose surrounded by a heating coil R, the two coils being connected in series with one another and in parallel with the electrodes F. Included into the electrode-circuit is an electromagnet S which controls a contact T included in the heating-coil circuit. When the current is first turned on, the electrodes F are cold and do not conduct, hence all the current will flow through the coils R which will quickly heat up the electrodes, whereupon current will flow through the parallel circuit. The current flowing through the electrodes F will energize the electromagnet S which will open the contact T and thereby cut out the heating coils.

The gaseous particles from the electrodes F, when reaching the mixing chamber, will envelop each particle of the refractory oxid with a layer or film of the material of which the electrodes F are made, this thorough intermixing being made possible by the combined action of the air-blast and of the continual motion of the oxid particles. The same action also accelerates the mixing process which in my process is of much less duration than in the former processes. The time required for each charge depends upon the amount of material treated, upon the rate of flow of the air blast, and upon the pressure applied.

After the treatment of the oxid is completed, the vessel A is discharged and the resulting powder is molded under hydraulic pressure into blocks or ingots which are then heated in a suitable furnace in the presence of hydrogen or other deoxidizing gas which carries off the foreign admixture of the oxid and reduces it to more or less pure metal. The reduced material is then sintered together by passing an electric current through the block gradually until the particles intimately cohere. The block is then ready for swaging, rolling, drawing, or any other mechanical operation required by the refractory material.

When tungsten or other wires drawn from refractory materials are used as filaments in incandescent lamps, especially when alternating current is employed, a condition is often produced known as "offsetting," which consists in a relative transverse motion of the particles of the filaments, due to their developing a coarse crystalline structure and becoming brittle. It has been found that the addition of certain oxids greatly reduce the "offsetting" effect, and for this reason it may be desirable not to eliminate all the impurities of the block in the reduction furnace, but to leave a small percentage of such foreign matter as will be most beneficial in each particular case.

In Fig. 3, the tank U is filled with a suitable solution, such as thorium nitrate, or with a paste such as casein, or with a suitable compound of different solutions or pastes, and is connected up with the vessel A in a similar manner as for the gaseous method previously described, except that the pressure in this case is, for variety, supplied by a rotary pump V. After a sufficient quantity of the solution or paste has been forced into the mixing chamber, the resulting paste, which, as in the gaseous process, is more uniformly mixed and in more intimate contact with the oxid particles than in any of the liquid or paste processes practised at present, is then reduced to comparatively pure metal by heating or deoxidizing. After sintering, as in the preceding process described above, the paste is made into rods or wires by squirting it through suitable dies.

The diagram given in Fig. 4, finally, shows a closed vessel W filled with a powder of a similar material as the solution in tank U of Fig. 3 and connected to the pipe X by a valve Y. The pipe X leads from the blower H to a heater M which, in turn, is connected to the blast-box G of converter A by pipes I and J. By properly operating valve Y, either manually or automatically, a proper quantity of the powder contained in vessel W is periodically dropped into pipe X and is thus injected into vessel A where it is mixed with the oxid. If desired, a gas or liquid may be applied in addition to the powder, so that the resulting mixture may be obtained either in the form of a powder or of a paste, which is subjected to the same treatment as the oxid mixtures obtained by the other processes.

While different modes of producing the air-blast are shown for the different methods of mixing the auxiliary material with the refractory oxid, any one of the pressure sources may be employed for any or all of the different methods of mixing.

The gas in Figs. 1 and 2, may be produced by chemical means or in some other way and placed in a tank under pressure; in this case, the electric arc chamber K with its electrode F, etc., may be dispensed with.

Although the description of the above process refers principally to the manufacture of ductile tungsten, it may equally well be applied, with slight modifications if necessary, to other metals, like molybdenum, chromium, etc., or even to certain non-metallic substances.

Having thus described my invention, I make the following claims:

1. In the process of making ductile bodies of refractory materials, the step which consists in admixing an auxiliary binding material to the refractory oxid by the aid of a blast of air, substantially as described.

2. In the process of making ductile bodies of refractory materials, the step which consists in admixing an auxiliary binding material to the refractory oxid under continual agitation of the refractory oxid, the said oxid being placed in powdered form into a vessel suitably supported for this purpose.

3. In the process of making ductile bodies of refractory materials, the step which consists in admixing an auxiliary binding material to the refractory oxid under air-pressure as well as under continual agitation, the said oxid being placed into a vessel suitably arranged for this purpose.

4. In the process of making ductile bodies of refractory materials, the step which consists in admixing an auxiliary binding material to the refractory oxid powder in the gaseous form, the said auxiliary gas being produced by the volatilization of suitable electrodes in an electric arc, substantially as described.

Signed at New York city, in the county of New York and State of New York this 26th day of June, A. D. 1916.

PETER ORANCE.

Witnesses:
ALFRED E. WIENER,
FRANK B. COOPER.